Figure 1:
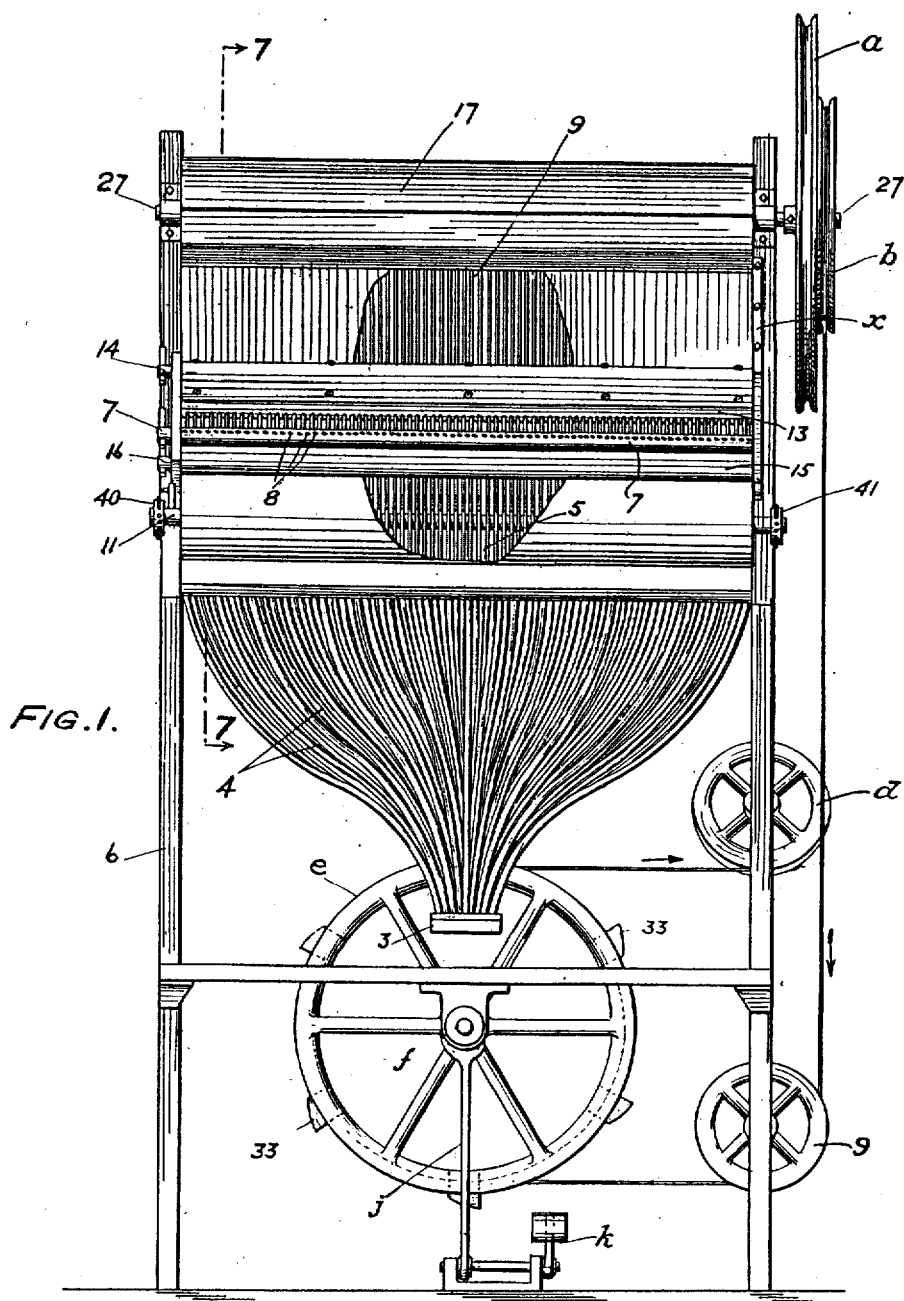

H. A. STILLWELL.
MACHINE FOR ASSEMBLING SHELLS IN SHELL HOLDERS.
APPLICATION FILED APR. 17, 1909.

952,477.

Patented Mar. 22, 1910.
3 SHEETS—SHEET 1.

WITNESSES:

INVENTOR
Howard A. Stillwell
BY
Harding & Harding
ATTORNEYS.

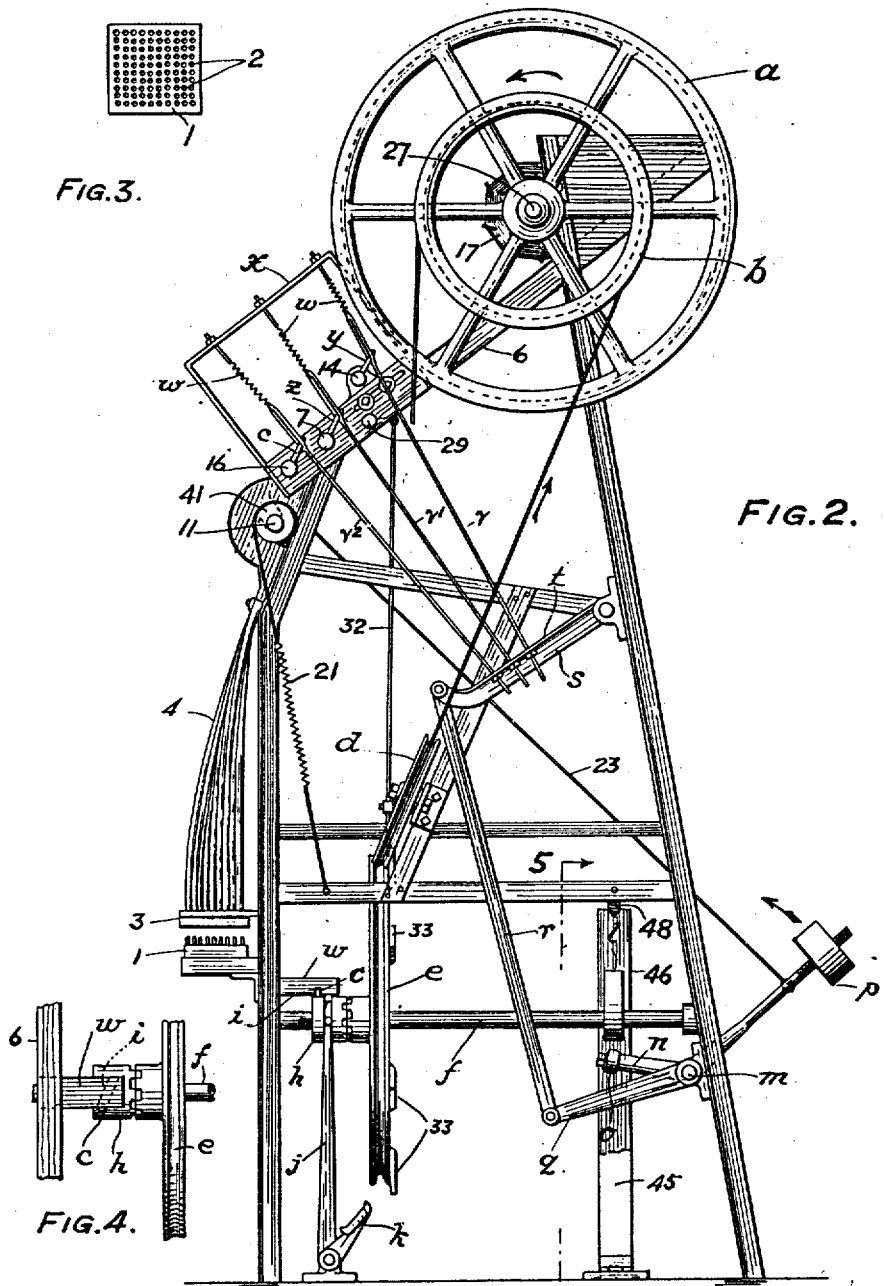

H. A. STILLWELL.
MACHINE FOR ASSEMBLING SHELLS IN SHELL HOLDERS.
APPLICATION FILED APR. 17, 1909.
952,477.
Patented Mar. 22, 1910.
3 SHEETS—SHEET 3.
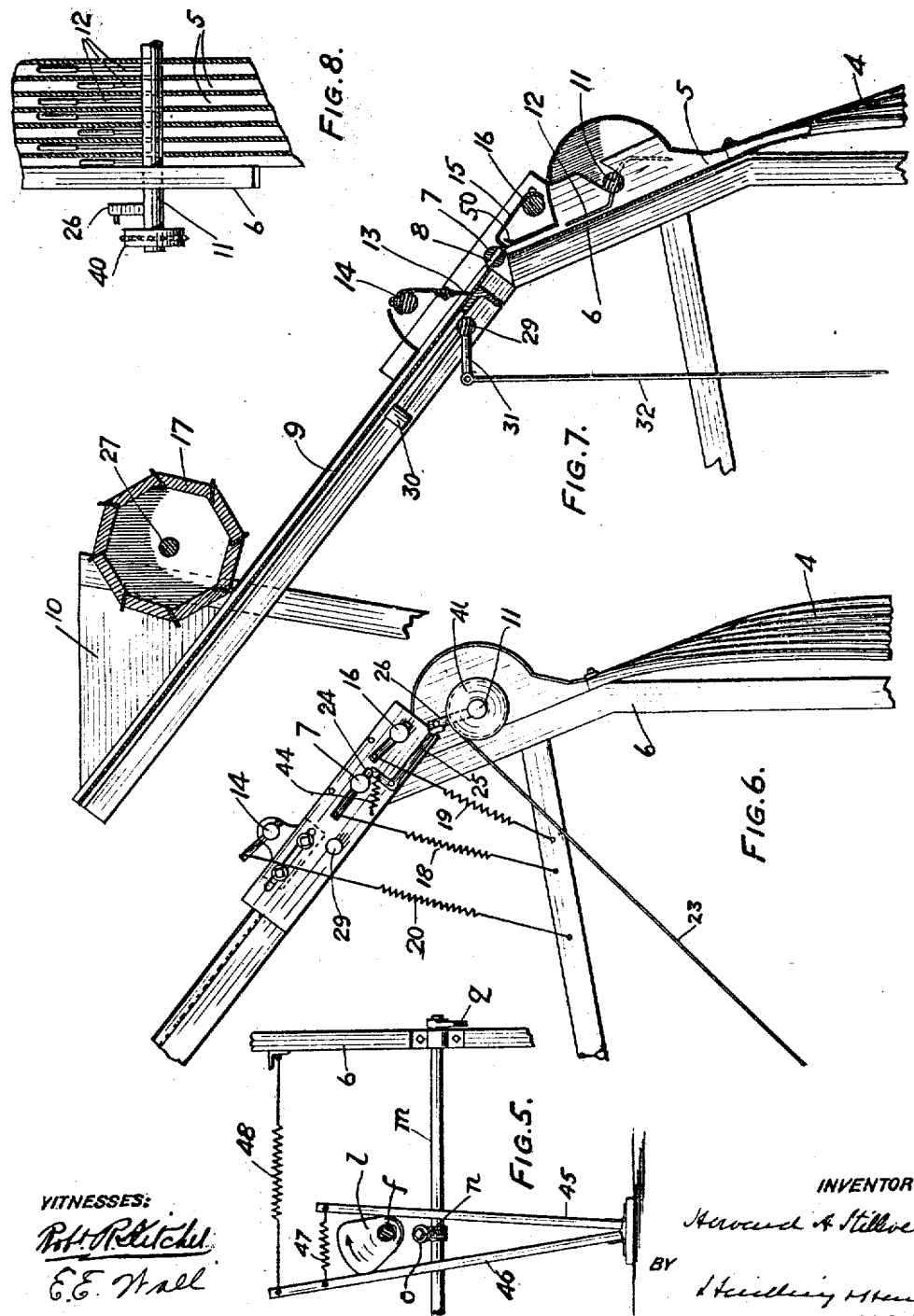
WITNESSES:
INVENTOR
Harvard A. Stillwell
BY
ATTORNEYS.

UNITED STATES PATENT OFFICE.

HOWARD A. STILLWELL, OF WOODBURY, NEW JERSEY, ASSIGNOR TO E. I. DU PONT DE NEMOURS POWDER COMPANY, OF WILMINGTON, DELAWARE, A CORPORATION OF NEW JERSEY.

MACHINE FOR ASSEMBLING SHELLS IN SHELL-HOLDERS.

952,477.  Specification of Letters Patent.  Patented Mar. 22, 1910.

Application filed April 17, 1909. Serial No. 490,542.

*To all whom it may concern:*

Be it known that I, HOWARD A. STILL-WELL, a citizen of the United States, residing at Woodbury, county of Gloucester and State of New Jersey, have invented a new and useful Improvement in Machines for Assembling Shells in Shell-Holders, of which the following is a full, clear, and exact description, reference being had to the accompanying drawings, which form a part of this specification.

Ordinarily, preparatory to loading priming shells with the fulminate, they are assembled by hand in sockets in a plate or block forming the shell holder, with their open ends exposed. The fulminate or other explosive is then packed in such shells.

The object of my invention is the production of a machine in which the shells may be deposited in a hopper and from which they may be delivered automatically to and into the sockets in the shell holder. Further, they are so delivered that the open ends of all the shells are exposed.

By this machine, the hand manipulation in placing the shells in the shell holder is avoided, with the consequent saving of time and expense.

I will first describe the embodiment of my invention illustrated in the accompanying drawings, and then point out the invention in the claims.

In the drawings: Figure 1 is a side elevation partially broken away. Fig. 2 is an end elevation. Fig. 3 is a detail plan view of shell holder. Fig. 4 is a detail plan view of clutch mechanism. Fig. 5 is a partial section on line 5—5, Fig. 2. Fig. 6 is a side view of part of machine from side opposite to that of Fig. 2. Fig. 7 is an enlarged section on line 7—7 Fig. 1. Fig. 8 is a detail sectional view of pin shaft, pins, and shells thereon and channels.

1 is the shell holder, having the depressions 2 for supporting the shells during loading.

3 is a plate. This plate 3 forms the lower end of the tubes 4, the mouth of each tube registering with a depression 2 of the shell holder 1. The upper end of each tube registers with a channel 5 formed in the casing 6 of the machine. These channels extend upward to the rock shaft 7. At the upper end of the channels the walls are flared as shown at 50, Fig. 7. This shaft 7 has through it orifices 8, which in one position of the shaft aline with the channels 5, and in the reverse position with the channels 9, which extend upward to the mouth of the hopper 10. The walls of the channels 5 between the orificed shaft 7, and the tubes 4 are partially cut away, and in this cut away portion is seated the rocking roller or shaft 11 having projecting therefrom, in each channel 5, a pin 12. There is a passage way in each channel above and below the roller or shaft 11. In the channels 9 are the fingers 13, preferably formed of rubber and connected to the rock shaft 14.

15 is a backing plate connected to the rock shaft 16, and closing the orifices 8 in shaft 7 adjacent to channels 5.

In the mouth of the hopper 10 is the rotating agitator 17.

The operation is as follows: The pins 12 rest in the channels 5, pointing toward the orificed shaft 7 when the orificed shaft is in such position that the orifices 8 register with channel 5. The fingers 13 close the channels 9, and have the shells from the hopper in said channels resting against said fingers and held back thereby. The movements are then as follows: The shaft 11 rocks to move the pins 12 so that they point away from the orificed shaft 7. The orificed shaft rocks so that the orifices are in alinement with the channels 9. The backing plate covers the lower ends of the orifices, the fingers then rock to uncover the channels 9. The shells therein pass into the orifices 8 in shaft 7, and are held from passing therethrough by the backing plate 15. The shaft 11 rocks so as to swing the pins 12 180°, more or less, to a point toward orificed shaft 7. The shaft 7 then rocks so that the orifices 8 aline with channels 5, the backing plate 15 rocks to uncover the orifices just before the shaft 7 rocks as just described, the orifices 8 aline with the channels, the shells being then caught by the flared wall 50. The shells then pass into the channels 5 and rest against the pins 12. When the pin shaft 11 again rocks, the pins move over, without affecting such of the shells whose closed end rests against said pins. These then pass through channels 5, back of shaft or roller 11, and so on down the tubes. As to those whose open end approaches the pins, they are caught by the pins and in this movement of the pins are turned 180°, more or less, and continue in the channels 5 beyond the roller. Thus all the shells approach and pass through the tubes 4, pass through orificed plate 3, and enter sockets 2 in shell holder, all pointing in the same direction and with their open end up. I will now describe the mechanism by which these movements are produced.

$a$ is the main driving wheel driven from source of power not shown.

$b$ is a pulley. From this pulley $b$ a rope passes over idler $d$ to pulley $e$ loose on shaft $f$, back over idler $g$ to pulley $b$.

$h$ is the movable member of a clutch and is splined on shaft $f$, the other member of this clutch is formed on hub of pulley $e$. This clutch is operated to open by the cam slot $i$ in the frame $w$ operating on pin $c$ of movable clutch member $h$. The clutch is operated in the other direction to engage by rod $j$ and treadle $k$.

On shaft $f$ is a cam $l$ having high and low points. This cam $l$ rests between the pivoted arms. The arm 45 is connected to arm 46 by spring 47 and the arm 46 by spring 48 with the frame of the machine.

$m$ is a rock shaft having the projecting arm $n$ provided at its outer end with the roller $o$, in line of said cam $l$. The shaft $m$ has also the counter weight $p$. Connected to rock shaft $m$ is an arm $q$ connected by link $r$ with pivoted arm $s$. This arm $s$ has a flange $t$ provided with orifices through which orifices, respectively, pass one end of rods $v$, $v'$, $v^2$. The other ends of these rods are connected by springs $w$ with the frame $x$. To rod $v$ is connected, by slot and pin connection, the end of arm $y$ which is attached to rock shaft 14 which carries the fingers 13. To rod $v'$ is connected by slot and pin connection, one end of the arm $z$, which arm is connected to orificed shaft 7. To rod $v^2$ is connected by slot and pin connection, one end of arm $c$, which is connected to shaft 16, on which backing plate 15 for orificed shaft is mounted.

To the counter weight is attached one end of a cord 23, which is connected to pulley 40, fixed on shaft 11, to move the roller so that pins 12 point in the direction of the orificed shaft 7. A rope or belt at one end connected to pulley 41 fixed on end of shaft 11, opposite to pulley 40, and at the other end to a spring 21, is used to operate the shaft 11 to rock it to cause the pins to point in the direction away from the orificed shaft 7.

The orificed shaft 7 had connected with it the spring 18, which tends to move said shaft so that it rocks to present its orifices to the channels 9. The shaft 16 of backing plate 15 is provided with a spring 19 tending to move it to cover the orifices in the orificed shaft 7, and the rock shaft 14 carrying fingers 13 has the spring 30 tending to move it to uncover channels 9.

With the parts in the position shown in Fig. 2, and the clutch connected, the operation is as follows: The rock shaft $m$ is rocked moving the counter weight in the direction of the arrow, allowing the pin shaft 11 to be moved by spring 21 to bring fingers pointing away from orificed shaft 7, the arm $s$ is pulled down, moving rods $v$, $v'$, $v^2$ down against action of springs $w$. This allows the arms $y$, $z$ and $c$ to follow down in the slots 22 and the springs 20, 18 and 19 cause them to follow down, moving the fingers 13 to free the channels 9, the orifices in shaft 7 into alinement with the channels 9, and closing backing plate 15, and the shells pass into the orifices 8 in shaft 7. The cam $l$ causes the movement of the rock shaft $m$ to continue slightly after these parts just described have assumed the positions just described, so that the arms $y$, $z$ and $c$ do not bottom in slots 22. The low part of the cam is then reached, and the counter weight acts. This at once, through cord 23, causes shaft 11 to rock in the opposite direction, bringing pins 12 in alinement with the orificed shaft 7. When under the springs $w$ act in the arms $x$, $y$ and $z$, moving the fingers 13 to close the channels 9, the orifices in shaft into alinement with the channels 5, and the shells pass into channels 5. When in this position, the pin $c$ on the movable member $h$ of the clutch has reached about the outer end of the cam slot $i$ and is freed from the fixed member $e$. The cam $l$ at this point has forced the arm 46 outward, extending the spring 48, the strength of which is sufficient to cause the cam $l$ to move sufficiently to turn the shaft $f$ so that the pin $c$ is freed from the cam slot $i$. The arm 45 acted on by spring 47 prevents the overthrow of the cam $l$ and further movement of shaft $f$ at this position. The clutch may again be engaged by the treadle $k$.

The purpose of the slight free movement of the rods $v$, $v'$, $v^2$ is to insure the pins 12 pointing in alinement with shaft 7 before the orifices in said shaft aline with the channels 5. In order to insure this with possibly greater certainty, I provide a locking pin 24 on the orificed shaft 7, against which, except when the pins 12 point toward the orificed shaft, rests one end of a bell crank or trigger 25, the other end being in alinement with an arm 26 on shaft 11, so that when the shaft 11 rocks to move the pins toward the orificed shaft, it also moves its arm 26, which, at the desired end of the movement of the shaft, when the pins are in proper position, pointing toward the orificed roller, strikes the bell crank and allows the orificed roller to move so that its orifices are brought in alinement with fingers 12. This insures that the pins shall be in proper position to receive the shell. On the reverse movement of the shaft 11, the arm 26 is moved away from the bell crank, and the spring 44 immediately throws the bell crank 25 into action to hold the shaft from movement in the direction toward the pins. As soon as the pins 12 in their movement toward the orificed shaft have moved sufficiently to release the bell crank, the arm 26 at once strikes the casing, thereby forming a positive stop to prevent the pins moving beyond this position.

Mounted upon the shaft 27 of main driving roll and at the mouth of the hopper 10 is a brush or agitator 17. The brushes on this roll just touch the tops of the divisions between channels 9 so that all caps not lying between and below the tops of the divisions are thrown back by the brushes. Those in the channels 9 run downward under the agitator.

Extending across the back of the frame of the machine, under the channels 9 adjacent to the stop fingers is the shaft 29 carrying the tappets or hammers 30. Upon shaft 29 is the crank 31 pivotally connected to vertical rod 32, the lower end of which rests upon irregular annular surfaces 33 connected to pulley e. By this, the bottom of the channels 9 are agitated while the rubber fingers are lifted to insure the shells passing therefrom at the proper time to and into the orifices in roller 8.

Having now fully described my invention, what I claim and desire to protect by Letters Patent is:

1. In a machine for assembling shells in a shell holder, the combination of a channel, a rocking pin in said channel intermediate of its height, and means to rock said pin to point in opposite directions in said channel.

2. In a machine for assembling shells in a shell holder, the combination of a plurality of channels, a rock shaft supported intermediate of the height of said channels, and a pin projecting from said shaft in alinement with each channel, and means to rock said shaft to point said pins in opposite directions in their corresponding channels.

3. In a machine for assembling shells in a shell holder, the combination of a channel, a rocking pin in said channel intermediate of its height, and means to rock said pin substantially one hundred and eighty degrees.

4. In a machine for assembling shells in a shell holder, the combination of a plurality of channels, a rock shaft supported intermediate of the height of said channels, and a pin projecting from said shaft in alinement with each channel, and means to rock said shaft substantially one hundred and eighty degrees.

5. In a machine for assembling shells in a shell holder, the combination of a hopper, channels leading from said hopper, an orificed rock shaft at the end of said channels, channels leading from the opposite side of said orificed shaft, pins in said last mentioned channels, intermediate of their height, means to rock said shaft in one direction to bring its orifices in line with the channels from the hopper, and in the opposite direction to bring its orifices in line with the pins, and means to rock said pins toward and away from said orificed shaft.

6. In a machine for assembling shells in a shell holder, the combination of channels, an orificed rock shaft at the end of said channels, channels leading from the opposite side of said orificed shaft, pins in said last mentioned channels, intermediate of their height, means to rock said shaft in one direction to bring its orifices in line with the channels from the hopper, and in the opposite direction to bring its orifices in line with the pins, and means to rock said pins toward and away from said orificed shaft.

7. In a machine for assembling shells in a shell holder, the combination of a hopper to receive the shells, a channel, connection between said hopper and said channel, a rocking pin in said channel intermediate of its height, and means to rock said pin to point in opposite directions in said channel.

8. In a machine for assembling shells in a shell holder, the combination of a hopper to receive the shells, means to agitate the shells in said hopper, a channel, connection between said hopper and said channel, a rocking pin in said channel intermediate of its height, and means to rock said pin to point in opposite directions in said channel.

9. In a machine for assembling shells in a shell holder, the combination of a hopper to receive the shells, a plurality of channels, independent connections between said hopper and said channels, a rock shaft supported intermediate of the height of said channels, a pin projecting from said shaft in alinement with each channel, and means to rock said shaft to point said pins in opposite directions in their corresponding channels.

10. In a machine for assembling shells in a shell holder, the combination of a hopper to receive the shells, means to agitate the shells in said hopper, a plurality of channels, independent connections between said hopper and said channels, a rock shaft supported intermediate of the height of said channels, and a pin projecting from said shaft in alinement with each channel, and means to rock said shaft to point said pins in opposite directions in their corresponding channels.

11. In a machine for assembling shells in a shell holder, the combination of the orificed rock shaft, the channels leading to and the channels leading from said orificed rock shaft, the rocking pin shaft and its pins; and means to rock said orificed shaft in one direction to bring its orifices in line with the channels leading to said shaft, and in the opposite direction to cause said orifices to aline with the pins.

12. In a machine for assembling shells in a shell holder, the combination of the orificed rock shaft, the channels leading to and the channels leading from said orificed rock shaft, the rocking pin shaft and its pins, and means to rock said orificed shaft in one direction to bring its orifices in line with the channels leading to said shaft, and in the opposite direction to cause said orifices to aline with the pins, and means to rock said pin shaft to cause the pins to aline with said orifices and to rock in the other direction to cause the shells caught by said pins to be reversed in direction.

13. In a machine for assembling shells in a shell holder, the combination of the orificed rock shaft, the channels leading therefrom, the rocking pin shaft and its pins, means to rock said pin shaft toward said orificed shaft to cause its pins to point toward said orificed shaft, means to move said orificed shaft to bring its orifices in alinement with said pins.

14. In a machine for assembling shells in a shell holder the combination of the orificed rock shaft, the channels leading therefrom, the rocking pin shaft and its pins, means to rock said pin shaft toward said orificed shaft to cause its pins to point toward said orificed shaft, means to move said orificed shaft to bring its orifices in alinement with said pins, and locking means for holding said shaft from such movement, and means carried by said pin rock shaft for releasing said locking means.

15. In a machine for assembling shells in a shell holder, the combination of the orificed rock shaft, the channels leading to and the channels leading from said orificed rock shaft, the rocking pin shaft and its pins, and means to rock said orificed shaft in one direction to bring its orifices in line with the channels leading to said shaft, and in the opposite direction to cause said orifices to aline with the pins, and a shield covering the opposite end of said orifices when in alinement with the channels leading to said shaft, and means to release said shield in the movement of the orificed shaft to aline the orifices with the pins.

16. In a machine for assembling shells in a shell holder, the combination of the orificed rock shaft, the channels leading to said orificed rock shaft, means to rock said shaft in one direction to bring said orifices in line with said channels, and in the other direction out of alinement, a rocking finger in each channel, and means to rock said fingers in one direction to open the channel, and in the other direction to close it beyond said fingers.

17. In a machine for assembling shells in a shell holder, the combination of the orificed shaft, channels leading therefrom, the rocking pin shaft and its pins in said channels, and means to rock said rocking pin shaft and said orificed shaft first in one direction and then in the other in a predetermined order in relation to each other.

18. In a machine for assembling shells in a shell holder, the combination of the orificed shaft, the channels leading thereto and therefrom, the rocking pin shaft and its pins in the last mentioned channels, and means to rock said rocking pin shaft and said orificed shaft first in one direction and then in the other in a predetermined order in relation to each other.

19. In a machine for assembling shells in a shell holder, the combination of the orificed shaft, the channels leading thereto and therefrom, the rocking pin shaft and its pins in the last mentioned channels, the rocking fingers in the first mentioned channels, and means to rock said rocking pin shaft, said orificed shaft and said rocking fingers first in one direction and then in the other direction, in a predetermined order in relation to each other.

20. In a machine for assembling shells in a shell holder, the combination of the orificed shaft, channels leading therefrom, the rocking pin shaft and its pins in said channels, a driving shaft, a main rock shaft, and independent and differently timed connections between said rock shaft and said rocking pin shaft, and said rock shaft and said orificed shaft.

21. In a machine for assembling shells in a shell holder, the combination of the orificed shaft, the channels leading thereto and therefrom, the rocking pin shaft and its pins in the last mentioned channels, the rocking fingers in the first mentioned channels, a driving shaft, a main rock shaft, and independent and differently timed connections between said rock shaft and said rocking pin shaft, said rock shaft and said orificed shaft, and said rocking shaft and said rocking fingers.

22. In a machine for assembling shells in a shell holder, the combination of the rocking pin shaft and its pins, the rocking orificed shaft, means for moving each shaft in both directions, a driving shaft, and connections between said driving shaft and said pin shaft, and said orificed shaft for controlling the movement of said pin shaft and orificed shaft in both directions.

23. In a machine for assembling shells in a shell holder, the combination of the rocking pin shaft and its pins, the orificed shaft, the rocking shield, the rocking fingers, means to move said parts in both directions, a driving shaft and connections between said driving shaft and said parts for controlling their movement in both directions.

24. In a machine for assembling shells in a shell holder, the combination of the rocking pin shaft and its pins, the rocking orificed shaft, means for moving each shaft in both directions, a rock shaft, means to rock said shaft in opposite directions, connections between said rock shaft, and said pin shaft and said orificed shaft for controlling the movement of said pin shaft and orificed shaft in both directions.

25. In a machine for assembling shells in a shell holder, the combination of the rocking pin shaft and its pins, the orificed shaft, the rocking shield, the rocking fingers, means to move said parts in both directions, a rock shaft, means to rock said shaft in opposite directions, connection between said rock shaft and said parts for controlling their movements in both directions.

26. In a machine for assembling shells in a shell holder, the combination of the rocking pin shaft and its pins, the rocking orificed shaft, a driving shaft, a cam upon said shaft, a rock shaft, a rocking arm, connection between said arm and said rock shaft, a rod connected to said arm, a spring acting upon said rod, there being a slot in said rod, connection between the orificed shaft and the arm through the medium of said slot, and direct connection between the pin shaft and said rock shaft, and springs independently operatively connected to said pin shaft and said orificed shaft.

27. In a machine for assembling shells in a shell holder, the combination of the rocking pin shaft and its pins, the rocking orificed shaft, a rock shaft, a rocking arm, connection between said arm and said rock shaft, a rod connected to said arm, a spring acting upon said rod, there being a slot in said rod, connection between the orificed shaft and the arm through the medium of said slot, and direct connection between the pin shaft and said rock shaft, and springs independently operatively connected to said pin shaft and said orificed shaft.

28. In a machine for assembling shells in a shell holder, the combination of the rocking pin shaft and its pins, the orificed shaft, the backing plate, the rocking fingers, a driving shaft, a cam upon said shaft, a rock shaft, a rocking arm, connection between said rocking arm and said rock shaft, rods, each having a slot connected at one end to said arm, springs acting upon the other end, and connection through the medium of said slots with the orificed shaft, the rocking shield and the rocking fingers, and direct connection between the rocking pin shaft and said rock shaft, and independent springs operatively connected to said parts.

29. In a machine for assembling shells in a shell holder, the combination of the rocking pin shaft and its pins, the orificed shaft, the backing plate, the rocking fingers, a rock shaft, a rocking arm, connection between said rocking arm and said rock shaft, rods, each having a slot connected at one end to said arm, springs acting upon the other end, and connection through the medium of said slots with the orificed shaft, the rocking shield and the rocking fingers, and direct connection between the rocking pin shaft and said rock shaft, and independent springs operatively connected to said parts.

30. In a machine for assembling shells in a shell holder, the combination of the rocking pin shaft and its pins, the rocking orificed shaft, a driving shaft, a cam upon said shaft, a rock shaft, a rocking arm, connection between said arm and said rock shaft, a rod connected to said arm, a spring acting upon said rod, there being a slot on said rod, connection between the rocking orificed shaft and the rod through the medium of said slot, and springs independently operatively connected to said pin shaft and said orificed shaft.

31. In a machine for assembling shells in a shell holder, the combination of the rocking pin shaft and its pins, the rocking orificed shaft, a rock shaft, a rocking arm, connection between said arm and said rock shaft, a rod connected to said arm, a spring acting upon said rod, there being a slot in said rod, connection between the rocking orificed shaft and the rod through the medium of said slot, and springs independently operatively connected to said pin shaft and said orificed shaft.

32. In a machine for assembling shells in a shell holder, the combination of the rocking pin shaft and its pins, the orificed shaft, the backing plate, the rocking fingers, a driving shaft, a cam upon said shaft, a rock shaft, a rocking arm, connection between said rocking arm and said rock shaft, rods, each having a slot connected at one end to said arm, springs acting upon the other end, and connection through the medium of said slots with the orificed shaft, the rocking shield and the rocking fingers, and independent springs operatively connected to said parts.

33. In a machine for assembling shells in a shell holder, the combination of the rocking pin shaft and its pins, the orificed shaft, the backing plate, the rocking fingers, a rocking arm, connection between said rocking arm and said rock shaft, rods, each having a slot connected at one end to said arm, springs acting upon the other end, and connection through the medium of said slots with the orificed shaft, the rocking shield and the rocking fingers, and independent springs operatively connected to said parts.

34. In a machine for assembling shells in a shell holder, the combination with the orificed shaft, and the channels leading thereto, of a rock shaft on the under side of said channels, knockers carried by said shaft, and means to rock said shaft to cause said knockers to intermittently strike the under surface of said channel.

35. In a machine for assembling shells in a shell holder, the combination with the orificed shaft, and the channels leading thereto, of a rock shaft on the under side of said channels, knockers carried by said shaft, a rod connected to said rock shaft, an operating shaft, a wheel on said shaft against which said rod rests, a lug upon said wheel adapted to intermittently oscillate said rod to cause the knockers to strike the under surface of the channels.

36. In a machine for assembling shells in a shell holder, the combination of the operating shaft, the operating cam thereon, the driving wheel loose on said shaft, a clutch member connected with said wheel, a coacting clutch member movable upon the operating shaft, a pin upon said movable clutch member, and a fixed frame having an inclined slot in line of travel of said pin.

37. In a machine for assembling shells in a shell holder, the combination of the operating shaft, the operating cam thereon, the driving wheel loose on said shaft, a clutch member connected with said wheel, a coacting clutch member movable upon the operating shaft, a pin upon said movable clutch member, and a fixed frame having an inclined slot in line of travel of said pin, and a spring arm against which said cam acts during a portion of its movement, and which moves said cam when its action on the spring arm ceases.

38. In a machine for assembling shells in a shell holder, the combination of the operating shaft, the operating cam thereon, the driving wheel loose on said shaft, a clutch member connected with said wheel, a coacting clutch member movable upon the operating shaft, a pin upon said movable clutch member, and a fixed frame having an inclined slot in line of travel of said pin, and a spring arm against which said cam acts during a portion of its movement, and which moves said cam when its action on the spring arm ceases, and a second spring arm on the side of said cam opposite to the first mentioned spring arm for limiting the movement of the cam under the action of the first mentioned spring arm.

39. In a machine for assembling shells in a shell holder, the combination of the operating shaft, the operating cam thereon, the driving wheel loose on said shaft, a clutch member connected with said wheel, a coacting clutch member movable upon the operating shaft, a pin upon said movable clutch member, a fixed frame having an inclined slot in line of travel of said pin, and pivoted spring arms on opposite sides of said cam.

40. In a machine for assembling shells in a shell holder, the combination of the operating shaft, the operating cam thereon, the driving wheel loose on said shaft, a clutch member connected with said wheel, a coacting clutch member movable upon the operating shaft, a pin upon said movable clutch member, a fixed frame having an inclined slot in line of travel of said pin, a pivoted arm on one side of said cam, a spring connecting said arm, and a fixed portion of the machine, a pivoted arm on the opposite side of said cam, and a spring connecting said arms.

In testimony of which invention, I have hereunto set my hand, at Woodbury, N. J., on this eighth day of April, 1909.

HOWARD A. STILLWELL.

Witnesses:
LAURA M. SALISBURY,
ERNEST REDFIELD.